(12) United States Patent
Tamura et al.

(10) Patent No.: US 9,822,207 B2
(45) Date of Patent: Nov. 21, 2017

(54) SILICON-CONTAINING HIGHLY BRANCHED POLYMER AND CURABLE COMPOSITION CONTAINING THE SAME

(71) Applicant: NISSAN CHEMICAL INDUSTRIES, LTD., Tokyo (JP)

(72) Inventors: Hiroyasu Tamura, Funabashi (JP); Motonobu Matsuyama, Funabashi (JP); Masayuki Haraguchi, Funabashi (JP)

(73) Assignee: NISSAN CHEMICAL INDUSTRIES, LTD., Tokyo (JP)

( * ) Notice: Subject to any disclaimer, the term of this patent is extended or adjusted under 35 U.S.C. 154(b) by 91 days.

(21) Appl. No.: 14/417,660

(22) PCT Filed: Jul. 24, 2013

(86) PCT No.: PCT/JP2013/070059
§ 371 (c)(1),
(2) Date: Jan. 27, 2015

(87) PCT Pub. No.: WO2014/017542
PCT Pub. Date: Jan. 30, 2014

(65) Prior Publication Data
US 2015/0210797 A1   Jul. 30, 2015

(30) Foreign Application Priority Data

Jul. 27, 2012 (JP) .................................. 2012-167797

(51) Int. Cl.
| | |
|---|---|
| *C08F 230/08* | (2006.01) |
| *C08L 33/10* | (2006.01) |
| *B05D 3/02* | (2006.01) |
| *C09D 143/04* | (2006.01) |
| *C08J 7/04* | (2006.01) |
| *C08F 290/06* | (2006.01) |
| *B05D 3/06* | (2006.01) |
| *C08L 33/14* | (2006.01) |
| *C09D 7/12* | (2006.01) |
| *C09D 4/00* | (2006.01) |

(52) U.S. Cl.
CPC .......... *C08F 230/08* (2013.01); *B05D 3/0272* (2013.01); *B05D 3/067* (2013.01); *C08F 290/068* (2013.01); *C08J 7/047* (2013.01); *C08L 33/10* (2013.01); *C08L 33/14* (2013.01); *C09D 7/125* (2013.01); *C09D 143/04* (2013.01); *C08J 2367/02* (2013.01); *C08J 2483/04* (2013.01); *C09D 4/00* (2013.01); *Y10T 428/264* (2015.01)

(58) Field of Classification Search
USPC .................. 428/335, 447; 528/25; 525/326.5
See application file for complete search history.

(56) References Cited

U.S. PATENT DOCUMENTS

| | | | | |
|---|---|---|---|---|
| 5,614,321 | A | * | 3/1997 | Medford .................. C08J 7/047 428/412 |
| 2005/0197472 | A1 | | 9/2005 | Ramesh |

FOREIGN PATENT DOCUMENTS

| | | |
|---|---|---|
| EP | 1806614 A1 | 7/2007 |
| JP | 2000-290326 A | 10/2000 |
| JP | 2002-121487 A | 4/2002 |
| JP | 2004-075755 A | 3/2004 |
| JP | 2004-224906 A | 8/2004 |
| JP | 2004-075755 * | 11/2004 |
| JP | 2005-152751 A | 6/2005 |
| JP | 2006-126797 A | 5/2006 |
| WO | 2012/074071 A1 | 6/2012 |

OTHER PUBLICATIONS

Oct. 8, 2013 Written Opinion issued in International Application No. PCT/JP2013/070059.
Oct. 8, 2013 International Search Report issued in Application No. PCT/JP2013/070059.
Dec. 8, 2016 Extended Search Report issued in European Patent Application No. 16192343.8.

\* cited by examiner

*Primary Examiner* — Tae H Yoon
(74) *Attorney, Agent, or Firm* — Oliff PLC

(57) ABSTRACT

There is provided a composition for forming a hard coat layer which has high slippage and is excellent in water/oil repellency and also has antifouling properties such as fingerprint resistance and dirt wiping-off properties, and which is curable through ultraviolet irradiation in a nitrogen atmosphere or an air atmosphere that is generally used. A silicon-containing highly branched polymer obtained by polymerization of a monomer A having two or more radically polymerizable double bonds in a molecule and a monomer B having a polysiloxane chain and at least one radically polymerizable double bond in a molecule in the presence of a polymerization initiator D in an amount of 5 to 200% by mole relative to the number of moles of the monomer A; a curable composition including the highly branched polymer; a cured film obtained from the composition; and a hard coat film obtained by use of the composition.

33 Claims, 1 Drawing Sheet

US 9,822,207 B2

SILICON-CONTAINING HIGHLY BRANCHED POLYMER AND CURABLE COMPOSITION CONTAINING THE SAME

This application is a 371 national stage entry of International Patent Application No. PCT/JP2013/070059, filed on Jul. 24, 2013, which claims the benefit of priority to JP 2012-167797, filed on Jul. 27, 2012, all of which are hereby incorporated herein by reference in their entirety.

TECHNICAL FIELD

The present invention relates to a silicon-containing highly branched polymer, a curable composition comprising the silicon-containing highly branched polymer, and a hard coat film obtained from the composition.

BACKGROUND ART

Polymer (macromolecular) materials have been increasingly used in various fields. In such circumstances, the surface or interface characteristics of a polymer become important depending on each field in addition to properties of the polymer as a matrix. For example, the use of a fluorine compound having a low surface energy as a surface modifier is expected to improve characteristics relating to surface/interface control, such as water/oil repellency, antifouling properties, non-adhesive properties, separation properties, mold releasability, slippage, abrasion resistance, anti-reflectivity, and chemical resistance, and various fluorine compounds have been developed.

For the surfaces of various displays such as liquid crystal displays (LCDs), plasma displays (PDPs), and touch panels, various plastic films having a hard coat layer for preventing scratches are used. To the hard coat layer, fingerprint marks and dirt readily adhere, and the fingerprint marks and dirt attached are difficult to be removed. Such marks and dirt greatly reduce the visibility of images on the display or impair the appearance of the display. In particular, a user directly touches the surface of a touch panel with fingers, and thus there is a great demand for the surface to which fingerprint marks are unlikely to adhere and from which fingerprint marks are easily removed if adhere.

As a hard coat layer-forming coating solution for forming such a hard coat layer, a hard coat layer-forming composition containing a silicone compound and/or a fluorine compound is specifically disclosed. The composition is irradiated with active energy rays to form a cured layer, which has excellent antifouling properties and slippage (Patent Document 1). A coating-forming curable composition containing a fluorine-containing highly branched polymer and a perfluoropolyether compound and/or a silicone compound is also disclosed. The composition is used to form a hard coat film, which has excellent surface characteristics such as fingerprint resistance (Patent Document 2). A coating composition containing a branched polymer having polysiloxane side chains is further disclosed. The composition is used to form a macromolecular molded article, which can maintain anti-adhesion and dirt repellency properties for a long period of time (Patent Document 3).

PRIOR ART DOCUMENTS

Patent Documents

Patent Document 1: Japanese Patent Application Publication No. 2005-152751 (JP 2005-152751 A)
Patent Document 2: International Publication WO 2012/074071, pamphlet
Patent Document 3: Japanese Patent Application Publication No. 2002-121487 (JP 2002-121487 A)

SUMMARY OF THE INVENTION

Problem to be Solved by the Invention

As described above, various methods have been developed for modifying the surfaces of hard coat layers by adding a silicon compound (silicone surface control agent) or a fluorine compound (fluorine surface control agent) to a hard coat layer-forming coating solution. However, various displays and electronic cases each having the hard coat layer containing a silicon compound or a fluorine compound have issues. In other words, a user of such a device cannot thoroughly remove dirt attached to the surface of the device with tissues or wet tissues if the surface has insufficient slippage. On recent touch panels of smartphones, tablet computers, and other devices, operation of tracing the surface with a finger, such as slide and flick, is carried out, and thus there is a demand for a technique of providing a surface having higher slippage.

In other words, there is a demand for a hard coat layer-forming composition having high slippage and excellent water/oil repellency and is curable by ultraviolet irradiation in a common nitrogen atmosphere or air atmosphere.

Means for Solving the Problem

As a result of intensive studies for solving the problems, the inventors of the present invention have found that the addition of a silicon-containing highly branched polymer obtained by polymerization of a monomer A having two or more radically polymerizable double bonds in the molecule and a monomer B having a polysiloxane chain and at least one radically polymerizable double bond in the molecule in the presence of a polymerization initiator D in an amount of 5 to 200% by mole relative to the number of moles of the monomer A, to a curable composition allows a cured film obtained from the composition to have high slippage and water/oil repellency and that the cured film can exhibit such characteristics by ultraviolet irradiation in common curing conditions, and have accomplished the present invention.

Specifically, the present invention relates to, as a first aspect, a silicon-containing highly branched polymer obtained by polymerization of a monomer A having two or more radically polymerizable double bonds in a molecule and a monomer B having a polysiloxane chain and at least one radically polymerizable double bond in a molecule in the presence of a polymerization initiator D in an amount of 5 to 200% by mole relative to the number of moles of the monomer A.

As a second aspect, the present invention relates to a silicon-containing highly branched polymer obtained by polymerization of a monomer A having two or more radically polymerizable double bonds in a molecule, a monomer B having a polysiloxane chain and at least one radically polymerizable double bond in a molecule, and a monomer C having a $C_{6-30}$ alkyl group or a $C_{3-30}$ alicyclic group and at least one radically polymerizable double bond in a molecule in the presence of a polymerization initiator D in an amount of 5 to 200% by mole relative to the number of moles of the monomer A.

As a third aspect, the present invention relates to the silicon-containing highly branched polymer according to the first aspect or the second aspect, in which the monomer B is a compound having at least one of a vinyl group and a (meth)acrylic group.

As a fourth aspect, the present invention relates to the silicon-containing highly branched polymer according to the third aspect, in which the monomer B is a compound of Formula [1]:

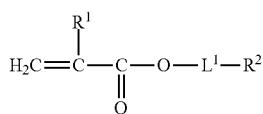
[1]

(where $R_1$ is a hydrogen atom or a methyl group; $R^2$ is a polysiloxane chain bonded to $L_1$ through a silicon atom; and $L_1$ is a $C_{1-6}$ alkylene group).

As a fifth aspect, the present invention relates to the silicon-containing highly branched polymer according to the fourth aspect, in which the monomer B is a compound of Formula [2]:

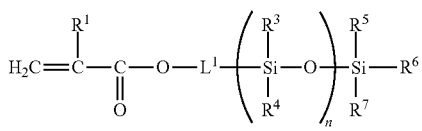
[2]

(where each of $R^1$ and $L^1$ is the same as defined in Formula [1]; each of $R^3$ to $R^7$ is independently a $C_{1-6}$ alkyl group; and n is an integer of 1 to 200).

As a sixth aspect, the present invention relates to the silicon-containing highly branched polymer according to the first aspect or the second aspect, in which the monomer A is a compound having one or both of a vinyl group and a (meth)acrylic group.

As a seventh aspect, the present invention relates to the silicon-containing highly branched polymer according to the sixth aspect, in which the monomer A is a divinyl compound or a di(meth)acrylate compound.

As an eighth aspect, the present invention relates to the silicon-containing highly branched polymer according to the second aspect, in which the monomer C is a compound having at least one of a vinyl group and a (meth)acrylic group.

As a ninth aspect, the present invention relates to the silicon-containing highly branched polymer according to the eighth aspect, in which the monomer C is a compound of Formula [3]:

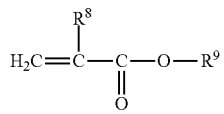
[3]

(where $R^8$ is a hydrogen atom or a methyl group; and $R^9$ is a $C_{6-30}$ alkyl group or a $C_{3-30}$ alicyclic group).

As a tenth aspect, the present invention relates to the silicon-containing highly branched polymer according to the first aspect or the second aspect, in which the polymerization initiator D is an azo polymerization initiator.

As an eleventh aspect, the present invention relates to the silicon-containing highly branched polymer according to any one of the first aspect to the tenth aspect, in which the silicon-containing highly branched polymer is obtained by using the monomer B in an amount of 0.01 to 10% by mole relative to the number of moles of the monomer A.

As a twelfth aspect, the present invention relates to the silicon-containing highly branched polymer according to any one of the second aspect to the tenth aspect, in which the silicon-containing highly branched polymer is obtained by using the monomer B in an amount of 0.01 to 10% by mole and the monomer C in an amount of 10 to 300% by mole relative to the number of moles of the monomer A.

As a thirteenth aspect, the present invention relates to a varnish comprising: the silicon-containing highly branched polymer as described in any one of the first aspect to the twelfth aspect.

As a fourteenth aspect, the present invention relates to a curable composition comprising: the silicon-containing highly branched polymer (a) as described in any one of the first aspect to the twelfth aspect in an amount of 0.01 to 10 parts by mass; an active energy ray curable polyfunctional monomer (b) in an amount of 100 parts by mass; and a polymerization initiator (c) generating a radical by an active energy ray in an amount of 0.1 to 25 parts by mass.

As a fifteenth aspect, the present invention relates to the curable composition according to the fourteenth aspect, in which the polyfunctional monomer (b) is at least one selected from the group consisting of polyfunctional (meth)acrylate compounds and polyfunctional urethane (meth)acrylate compounds.

As a sixteenth aspect, the present invention relates to the curable composition according to the fourteenth aspect or the fifteenth aspect, in which the polymerization initiator (c) is an alkylphenone compound.

As a seventeenth aspect, the present invention relates to the curable composition according to any one of the fourteenth aspect to the sixteenth aspect, further comprising at least one surface modifier (d) selected from the group consisting of perfluoropolyether compounds and silicone compounds, in an amount of 0.01 to 10 parts by mass.

As an eighteenth aspect, the present invention relates to the curable composition according to the seventeenth aspect, in which the surface modifier (d) is a compound having a (meth)acryloyl group.

As a nineteenth aspect, the present invention relates to the curable composition according to any one of the fourteenth aspect to the eighteenth aspect, further comprising a solvent (e).

As a twentieth aspect, the present invention relates to a cured film obtained from the curable composition as described in any one of the fourteenth aspect to the nineteenth aspect.

As a twenty-first aspect, the present invention relates to a hard coat film comprising: a hard coat layer on at least one side of a film substrate, in which the hard coat layer is formed by applying the curable composition as described in the nineteenth aspect on the film substrate to form a coating film, drying the coating film to remove the solvent, and irradiating the coating film with ultraviolet rays to cure the coating film.

As a twenty-second aspect, the present invention relates to the hard coat film according to the twenty-first aspect, in which the hard coat layer has a film thickness of 0.1 to 30 µm.

Effects of the Invention

To a silicon-containing highly branched polymer of the present invention, branched structures are intentionally introduced. The polymer molecules are thus entangled in a smaller degree than that of linear polymer molecules, and the polymer exhibits a fine particle-like behavior and has high solubility in organic solvents and high dispersivity in resins. These characteristics prevent the highly branched polymer from aggregating in a resin that is the matrix, readily transfer the polymer to the surface, and readily activate the resin surface. Thus, the addition of the silicon-containing highly branched polymer to a curable composition allows a cured film obtained from the composition to readily have a surface with high slippage and water/oil repellency.

A hard coat film of the present invention has high slippage and water/oil repellency and also has antifouling properties such as fingerprint resistance and dirt wiping-off properties.

A curable composition of the present invention, if containing, as the polymerization initiator, a polymerization initiator generating radicals by active energy rays, specifically, a particular polymerization initiator, can form a cured film having high slippage and water/oil repellency in common curing conditions, that is, through ultraviolet irradiation in a nitrogen atmosphere or an air atmosphere, without requiring particular curing conditions, for example, through electron beam irradiation in a nitrogen atmosphere.

MODES FOR CARRYING OUT THE INVENTION

<Silicon-Containing Highly Branched Polymer>

Figure 1:
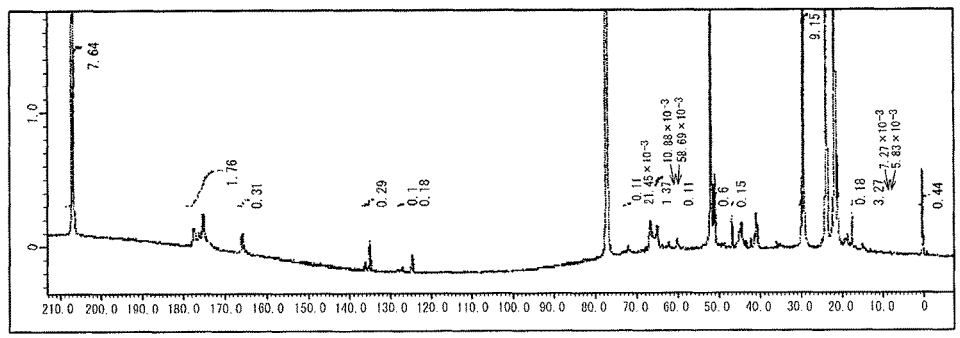
FIG. 1 is a view showing a $^{13}C$ NMR spectrum of HBP1 obtained in Example 1.

A silicon-containing highly branched polymer of the present invention is obtained by polymerization of a monomer A having two or more radically polymerizable double bonds in the molecule and a monomer B having a polysiloxane chain and at least one radically polymerizable double bond in the molecule in the presence of a polymerization initiator D in an amount of 5 to 200% by mole relative to the number of moles of the monomer A.

Another silicon-containing highly branched polymer of the present invention may be obtained by copolymerization of an additional monomer having a $C_{6-30}$ alkyl group or a $C_{3-30}$ alicyclic group and at least one radically polymerizable double bond in the molecule as a monomer C, if desired. Monomers other than the monomer A, the monomer B, or the monomer C may be copolymerized as long as the effect of the present invention is not impaired.

The silicon-containing highly branched polymer of the present invention is what is called an initiator-fragment incorporation radical polymerization (IFIRP) highly branched polymer and has a fragment of the polymerization initiator D used for the polymerization at a terminal.

[Monomer A]

In the present invention, the monomer A having two or more radically polymerizable double bonds in the molecule preferably has one or both of a vinyl group and a (meth) acrylic group and is particularly preferably a divinyl compound or a di(meth)acrylate compound.

In the present invention, the (meth)acrylate compound means both an acrylate compound and a methacrylate compound. For example, (meth)acrylic acid means acrylic acid and methacrylic acid.

Such a monomer A is exemplified by the following organic compounds (A1) to (A7).

(A1) Vinyl hydrocarbons:
(A1-1) Aliphatic vinyl hydrocarbons such as isoprene, butadiene, 3-methyl-1,2-butadiene, 2,3-dimethyl-1,3-butadiene, 1,2-polybutadiene, pentadiene, hexadiene, and octadiene
(A1-2) Alicyclic vinyl hydrocarbons such as cyclopentadiene, cyclohexadiene, cyclooctadiene, and norbornadiene
(A1-3) Aromatic vinyl hydrocarbons such as divinylbenzene, divinyltoluene, divinylxylene, trivinylbenzene, divinylbiphenyl, divinylnaphthalene, divinylfluorene, divinylcarbazole, and divinylpyridine (A2) Vinyl esters, allyl esters, vinyl ethers, allyl ethers, and vinyl ketones:
(A2-1) Vinyl esters such as divinyl adipate, divinyl maleate, divinyl phthalate, divinyl isophthalate, divinyl itaconate, and vinyl (meth)acrylate
(A2-2) Allyl esters such as diallyl maleate, diallyl phthalate, diallyl isophthalate, diallyl adipate, and allyl (meth)acrylate
(A2-3) Vinyl ethers such as divinyl ether, diethylene glycol divinyl ether, and triethylene glycol divinyl ether
(A2-4) Allyl ethers such as diallyl ether, di(allyloxy)ethane, tri(allyloxy)ethane, tetra(allyloxy)ethane, tetra(allyloxy) propane, tetra(allyloxy)butane, and tetra(methallyloxy) ethane
(A2-5) Vinyl ketones such as divinyl ketone and diallyl ketone (A3) (Meth)acrylic acid esters: such as ethylene glycol di(meth)acrylate, triethylene glycol di(meth)acrylate, propylene glycol di(meth)acrylate, neopentyl glycol di(meth) acrylate, trimethylolpropane tri(meth)acrylate, ditrimethylolpropane tetra(meth)acrylate, glycerol tri(meth) acrylate, pentaerythritol tetra(meth)acrylate, alkoxytitanium tri(meth)acrylate, 1,6-hexanediol di(meth)acrylate, 2-methyl-1,8-octanedioldi(meth)acrylate, 1,9-nonanediol di(meth)acrylate, 1,10-decanediol di(meth)acrylate, tricyclo[5.2.1.0$^{2,6}$]decanedimethanol di(meth)acrylate, dioxane glycol di(meth)acrylate, 2-hydroxy-1-acryloyloxy-3-methacryloyloxypropane, 2-hydroxy-1,3-di(meth)acryloyloxypropane, 9,9-bis[4-(2-(meth)acryloyloxyethoxy)phenyl]fluorene, undecyleneoxyethylene glycol di(meth)acrylate, bis[4-(meth)acryloylthiophenyl]sulfide, bis[2-(meth)acryloylthioethyl]sulfide, 1,3-adamantanediol di(meth)acrylate, 1,3-adamantanedimethanol di(meth)acrylate, aromatic urethane di(meth)acrylate, and aliphatic urethane di(meth)acrylate (A4) Vinyl compounds having a polyalkylene glycol chain: such as polyethylene glycol (a molecular weight of 300) di(meth)acrylate and polypropylene glycol (a molecular weight of 500) di(meth)acrylate (A5) Nitrogen-containing vinyl compounds: such as diallylamine, diallyl isocyanurate, diallyl cyanurate, methylenebis(meth)acrylamide, and bismaleimide (A6) Silicon-containing vinyl compounds: such as dimethyldivinylsilane, divinyl(methyl)(phenyl)silane, diphenyldivinylsilane, 1,3-divinyl-1,1,3,3-tetramethyldisilazane, 1,3-divinyl-1,1,3,3-tetraphenyldisilazane, and diethoxydivinylsilane (A7) Fluorine-containing vinyl compounds: such as 1,4-divinylperfluorobutane, 1,4-divinyloctafluorobutane, 1,6- divinylperfluorohexane, 1,6-divinyldodecafluorohexane, 1,8-divinylperfluorooctane, and 1,8-divinylhexadecafluorooctane Among them, preferred monomers are the aromatic vinyl hydrocarbons of the group (A1-3), the vinyl esters, the allyl esters, the vinyl ethers, the allyl ethers, and the vinyl ketones of the group (A2), the (meth)acrylic acid esters of the group (A3), the vinyl compounds having a polyalkylene glycol chain of the group (A4), and the nitrogen-containing vinyl compounds of the group (A5). Specifically preferred monomers are divinylbenzene in the group (A1-3), diallyl phthalate in the group (A2-2), ethylene glycol di(meth)acrylate, 1,3-adamantanedimethanol di(meth)acrylate, tricyclo[5.2.1.0$^{2,6}$]decanedimethanol di(meth)acrylate, 2-hydroxy-1,3-di(meth)acryloyloxypropane, and aliphatic urethane di(meth)acrylate in the group (A3), and methylenebis(meth)acrylamide in the group (A5).

Among them, divinylbenzene, ethylene glycol di(meth)acrylate, tricyclo[5.2.1.0$^{2,6}$]decanedimethanol di(meth)acrylate, and 2-hydroxy-1,3-di(meth)acryloyloxypropane are preferred, and tricyclo[5.2.1.0$^{2,6}$]decanedimethanol di(meth)acrylate and 2-hydroxy-1,3-di(meth)acryloyloxypropane are particularly preferred.

[Monomer B]

In the present invention, the monomer B having a polysiloxane chain and at least one radically polymerizable double bond in the molecule preferably has at least one of a vinyl group and a (meth)acrylic group and is particularly preferably the compound of Formula [1] and more preferably the compound of Formula [2].

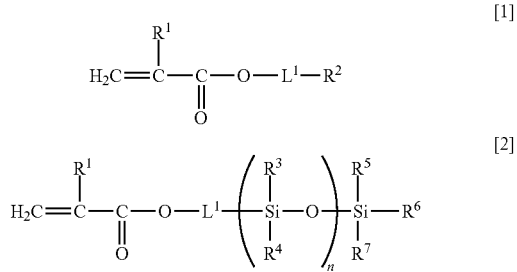

(In the formulae, R$_1$ is a hydrogen atom or a methyl group; R$^2$ is a polysiloxane chain bonded to L$^1$ through a silicon atom; each of R$^3$ to R$^7$ is independently a C$_{1-6}$ alkyl group; L$^1$ is a C$_{1-6}$ alkylene group; and n is an integer of 1 to 200)

Examples of the C$_{1-6}$ alkylene group as L$^1$ include a methylene group, an ethylene group, a trimethylene group, a methylethylene group, a tetramethylene group, a 1-methyltrimethylene group, a pentamethylene group, a 2,2-dimethyltrimethylene group, and a hexamethylene group.

Among them, a trimethylene group is preferred.

Examples of the C$_{1-6}$ alkyl group as R$^3$ to R$^7$ include a methyl group, an ethyl group, an n-propyl group, an isopropyl group, an n-butyl group, an isobutyl group, a sec-butyl group, a tert-butyl group, an n-pentyl group, an isopentyl group, a neopentyl group, an n-hexyl group, and a cyclohexyl group.

Among them, a methyl group, an ethyl group, and an n-butyl group are preferred.

n is preferably 10 to 100 in view of the surface modification effect.

Examples of such a monomer B include
α-butyl-ω-(3-(meth)acryloyloxyethyl)polydimethylsiloxane,
α-methyl-ω-(3-(meth)acryloyloxypropyl)polydimethylsiloxane,
α-butyl-ω-(3-(meth)acryloyloxypropyl)polydimethylsiloxane, and
α-butyl-ω-(3-(meth)acryloyloxyhexyl)polydimethylsiloxane. These monomers B may be used singly or in combination of two or more of them.

For the copolymerization of the monomer A and the monomer B in the present invention, the ratio of the monomer B is preferably 0.01 to 10% by mole, more preferably 0.1 to 10% by mole, and even more preferably 0.1 to 5% by mole relative to the number of moles of the monomer A in view of the reactivity and the surface modification effect.

[Monomer C]

In the present invention, the monomer C having a C$_{6-30}$ alkyl group or a C$_{3-30}$ alicyclic group and at least one radically polymerizable double bond in the molecule preferably has at least one of a vinyl group and a (meth)acrylic group and is particularly preferably the compound of Formula [3].

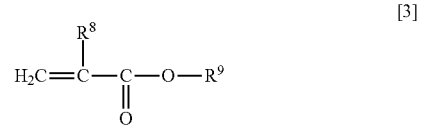

(In the formula, R$^8$ is a hydrogen atom or a methyl group; and R$^9$ is a C$_{6-30}$ alkyl group or a C$_{3-30}$ alicyclic group)

Examples of the C$_{6-30}$ alkyl group as R$^9$ include a hexyl group, an ethylhexyl group, a 3,5,5-trimethylhexyl group, a heptyl group, an octyl group, a 2-octyl group, an isooctyl group, a nonyl group, a decyl group, an isodecyl group, an undecyl group, a lauryl group, a tridecyl group, a myristyl group, a palmityl group, a stearyl group, an isostearyl group, an arachil group, a behenyl group, a lignoceryl group, a cerotoyl group, a montanyl group, and a melissyl group.

Specifically, the alkyl group preferably has 10 to 30 carbon atoms and more preferably 12 to 24 carbon atoms in view of the surface modification effect.

Examples of the C$_{3-30}$ alicyclic group as R$^9$ include a cyclopropyl group, a cyclobutyl group, a cyclopentyl group, a cyclohexyl group, a 4-tert-butylcyclohexyl group, an isobornyl group, a norbornenyl group, a menthyl group, an adamantyl group, and a tricyclo[5.2.1.0$^{2,6}$]decanyl group.

Specifically, C$_{3-14}$ alicyclic groups are preferred, and C$_{6-12}$ alicyclic groups are more preferred in view of the surface modification effect.

Examples of such a monomer C include hexyl(meth)acrylate, ethylhexyl(meth)acrylate, 3,5,5-trimethylhexyl(meth)acrylate, heptyl(meth)acrylate, octyl(meth)acrylate, 2-octyl(meth)acrylate, isooctyl(meth)acrylate, nonyl(meth)acrylate, decyl(meth)acrylate, isodecyl(meth)acrylate, undecyl(meth)acrylate, lauryl(meth)acrylate, tridecyl(meth)acrylate, palmityl(meth)acrylate, stearyl(meth)acrylate, isostearyl(meth)acrylate, behenyl(meth)acrylate, cyclopropyl(meth)acrylate, cyclobutyl(meth)acrylate, cyclopentyl(meth)acrylate, cyclohexyl(meth)acrylate, 4-tert-butylcyclohexyl(meth)acrylate, isobornyl(meth)acrylate, norbornenyl(meth)acrylate, menthyl(meth)acrylate, adamantyl(meth)acrylate, and tricyclo[5.2.1.0$^{2,6}$]decanyl(meth)acrylate. These monomers C may be used singly or in combination of two or more of them.

For the copolymerization of the monomer A and the monomer C in the present invention, the ratio of the monomer C is preferably 10 to 300% by mole, more preferably 20 to 150% by mole, and even more preferably 20 to 100% by mole relative to the number of moles of the monomer A in view of the reactivity and the surface modification effect.

[Polymerization Initiator D]

The polymerization initiator D is preferably an azo polymerization initiator. The azo polymerization initiator can be exemplified by the following compounds (1) to (5).

(1) Azonitrile Compounds:
such as 2,2'azobisisobutyronitrile, 2,2'-azobis(2-methylbutyronitrile),
2,2'-azobis(2,4-dimethylvaleronitrile), 1,1'-azobis(1-cyclohexanecarbonitrile),
2,2'-azobis(4-methoxy-2,4-dimethylvaleronitrile), and 2-(carbamoylazo)isobutyronitrile (2) Azoamide Compounds:
such as 2,2'-azobis {2-methyl-N-[1,1-bis(hydroxymethyl)-2-hydroxyethyl]propionamide},
2,2'-azobis{2-methyl-N-[2-(1-hydroxybutyl)]propionamide},
2,2'-azobis[2-methyl-N-(2-hydroxyethyl)propionamide],
2,2'-azobis[N-(2-propenyl)-2-methylpropionamide],
2,2'-azobis(N-butyl-2-methylpropionamide), and
2,2'-azobis(N-cyclohexyl-2-methylpropionamide)

(3) Cyclic Azoamidine Compounds:
such as 2,2'-azobis[2-(2-imidazolin-2-yl)propane]dihydrochloride,
2,2'-azobis[2-(2-imidazolin-2-yl)propane]disulfate dihydrate,
2,2'-azobis[2-[1-(2-hydroxyethyl)-2-imidazolin-2-yl]propane]dihydrochloride,
2,2'-azobis[2-(2-imidazolin-2-yl)propane], and
2,2'-azobis(1-imino-1-pyrrolidino-2-methylpropane)dihydrochloride (4) Azoamidine Compounds:
such as 2,2'-azobis(2-methylpropionamidine) dihydrochloride and
2,2'-azobis[N-(2-carboxyethyl)-2-methylpropionamidine] tetrahydrate (5) Other Compounds:
such as 2,2'-azobis(methyl isobutyrate), 4,4'-azobis(4-cyanopentanoic acid),
2,2'-azobis(2,4,4-trimethylpentane), 1,1'-azobis(1-acetoxy-1-phenylethane),
1,1'-azobis(methyl 1-cyclohexanecarboxylate), 4,4'-azobis(2-(perfluoromethyl)ethyl 4-cyanopentanoate), 4,4'-azobis(2-(perfluorobutyl)ethyl 4-cyanopentanoate), and
4,4'-azobis(2-(perfluorohexyl)ethyl 4-cyanopentanoate).

Among the above azo polymerization initiators, compounds having a substituent with a comparatively low polarity are preferred in view of the surface energy of a silicon-containing highly branched polymer to be obtained, and 2,2'-azobis(methyl isobutyrate) or 2,2'-azobis(2,4-dimethylvaleronitrile) are specifically preferred.

The polymerization initiator D is used in an amount of 5 to 200% by mole, preferably 20 to 200% by mole, and more preferably 20 to 100% by mole relative to the number of moles of the monomer A.

<Method for Producing Silicon-Containing Highly Branched Polymer>

The silicon-containing highly branched polymer of the present invention is obtained by polymerization of the monomer A, the monomer B, and, if desired, the monomer C in the presence of the polymerization initiator D in a predetermined amount relative to the amount of the monomer A. The polymerization method is exemplified by known methods such as solution polymerization, dispersion polymerization, precipitation polymerization, and bulk polymerization. Among them, the solution polymerization and the precipitation polymerization are preferred. To control the molecular weight, in particular, the solution polymerization in an organic solvent is preferred.

Examples of the organic solvent used for the polymerization include aromatic hydrocarbons such as benzene, toluene, xylene, ethylbenzene, and tetralin; aliphatic or alicyclic hydrocarbons such as n-hexane, n-heptane, mineral spirits, and cyclohexane; halides such as methyl chloride, methyl bromide, methyl iodide, dichloromethane, chloroform, carbon tetrachloride, trichloroethylene, perchloroethylene, and o-dichlorobenzene; esters or ester ethers such as ethyl acetate, butyl acetate, isobutyl acetate, methoxybutyl acetate, methyl cellosolve acetate, ethyl cellosolve acetate, and propylene glycol monomethyl ether acetate (PGMEA); ethers such as diethyl ether, tetrahydrofuran (THF), 1,4-dioxane, methyl cellosolve, ethyl cellosolve, butyl cellosolve, and propylene glycol monomethyl ether (PGME); ketones such as acetone, methyl ethyl ketone (MEK), methyl isobutyl ketone (MIBK), di-n-butyl ketone, and cyclohexanone; alcohols such as methanol, ethanol, n-propanol, isopropanol, n-butanol, isobutanol, tert-butanol, 2-ethylhexyl alcohol, benzyl alcohol, and ethylene glycol; amides such as N,N-dimethylformamide (DMF), N,N-dimethylacetamide, and N-methyl-2-pyrrolidone (NMP); sulfoxides such as dimethyl sulfoxide (DMSO), and these solvents may be used as a mixture of two or more of them.

Among them, preferred solvents are the aromatic hydrocarbons, the halides, the esters, the ethers, the ketones, the alcohols, and the amides. Specifically preferred solvents are exemplified by benzene, toluene, xylene, o-dichlorobenzene, ethyl acetate, butyl acetate, propylene glycol monomethyl ether acetate (PGMEA), propylene glycol monomethyl ether (PGME), tetrahydrofuran (THF), 1,4-dioxane, methyl ethyl ketone (MEK), methyl isobutyl ketone (MIBK), methanol, ethanol, n-propanol, isopropanol, n-butanol, isobutanol, tert-butanol, N,N-dimethylformamide (DMF), N,N-dimethylacetamide, and N-methyl-2-pyrrolidone (NMP).

For the polymerization in an organic solvent, the mass of the organic solvent is typically 5 to 120 parts by mass and preferably 10 to 110 parts by mass relative to 1 part by mass of the monomer A.

The polymerization is carried out under normal pressure, under pressure in a closed system, or under reduced pressure, and is preferably carried out under normal pressure in view of a simple apparatus and a simple operation. In addition, the polymerization is preferably carried out under an inert gas atmosphere such as a nitrogen atmosphere.

The polymerization is carried out at any temperature that is not higher than the boiling point of a reaction mixture. The temperature is preferably 50 to 200° C., more preferably 80 to 150° C., and even more preferably 80 to 130° C. in view of the polymerization efficiency and the molecular weight control.

The reaction time varies with the reaction temperature, the types and ratio of the monomer A, the monomer B, the monomer C, and the polymerization initiator D, the type of the polymerization solvent, and other conditions, and thus is not generally specified, but is preferably 30 to 720 minutes and more preferably 40 to 540 minutes.

After the completion of the polymerization, the obtained silicon-containing highly branched polymer is collected by any method and is subjected to after treatments such as washing, as necessary. The method for collecting the polymer from the reaction solution is exemplified by reprecipitation.

The silicon-containing highly branched polymer of the present invention has a weight average molecular weight (Mw) of 1,000 to 400,000 and preferably 2,000 to 200,000, which is determined by gel permeation chromatography in terms of polystyrene.

<Varnish>

The present invention also relates to a varnish comprising the silicon-containing highly branched polymer.

The solvent used in the varnish form may be any solvent capable of dissolving the silicon-containing highly branched polymer and is exemplified by aromatic hydrocarbons such as toluene; esters or ester ethers such as ethyl acetate, butyl acetate, isobutyl acetate, ethyl lactate, γ-butyrolactone, and propylene glycol monomethyl ether acetate (PGMEA); ethers such as tetrahydrofuran (THF), butyl cellosolve, diethylene glycol monoethyl ether, propylene glycol monomethyl ether (PGME), propylene glycol monoethyl ether, and hexafluoropropyl hexafluoro-2-pentyl ether; ketones such as acetone, methyl ethyl ketone (MEK), methyl isobutyl ketone (MIBK), and cyclohexanone; alcohols such as methanol and ethanol; and amides such as N,N-dimethylformamide (DMF). These solvents may be used singly or as a mixture of two or more of them.

The concentration at which the silicon-containing highly branched polymer is dissolved or dispersed in the solvent is optional. The concentration of the silicon-containing highly branched polymer is 0.001 to 90% by mass, preferably 0.002 to 80% by mass, and more preferably 0.005 to 70% by mass relative to the total mass (sum of the mass) of the silicon-containing highly branched polymer and the solvent.

The varnish can be applied onto a substrate by, for example, cast coating, spin coating, blade coating, dip coating, roll coating, bar coating, die coating, spray coating, ink-jetting, or printing (such as relief printing, intaglio printing, planographic printing, and screen printing), yielding a coating film. The obtained coating film may be dried with an apparatus such as a hot plate and an oven, as necessary, to form a film.

Among these coating methods, the spin coating is preferred. The spin coating can complete the coating in a short period of time, and thus a highly volatile solution can be used. In addition, the spin coating enables highly uniform coating, and hence is advantageously employed.

Examples of the substrate include substrates of plastics (including polycarbonate, polymethacrylate, polystyrene, polyesters such as poly(ethylene terephthalate) (PET), polyolefin, epoxy, melamine, triacetylcellulose, acrylonitrile-butadiene-styrene copolymers (ABS), acrylonitrile-styrene copolymers (AS), and norbornene resins), metal substrates, wood substrates, paper substrates, glass substrates, and slate substrates. The substrate may have a plate-like shape or a film-like shape, or be a three-dimensional molded article.

The thin film formed from the silicon-containing highly branched polymer may have any thickness, and the thickness is typically 0.01 to 50 μm and preferably 0.05 to 20 μm.

<Curable Composition>

The present invention further relates to a curable composition comprising the silicon-containing highly branched polymer (a), an active energy ray curable polyfunctional monomer (b), and a polymerization initiator (c) generating radicals by active energy rays.

[Active Energy Ray Curable Polyfunctional Monomer (b)]

Examples of the active energy ray curable polyfunctional monomer (b) include polyfunctional monomers containing two or more (meth)acryloyl groups, such as urethane acrylic monomers, epoxy acrylic monomers, and various (meth) acrylate monomers.

The monomer is preferably at least one monomer selected from the group consisting of polyfunctional (meth)acrylate compounds and polyfunctional urethane (meth)acrylate compounds.

Examples of such an active energy ray curable polyfunctional monomer include hexanediol di(meth)acrylate, neopentyl glycol di(meth)acrylate, triethylene glycol di(meth) acrylate, polyethylene glycol di(meth)acrylate, polypropylene glycol di(meth)acrylate, pentaerythritol di(meth)acrylate monostearate, ethoxylated bisphenol A (meth)acrylate, ethoxylated bisphenol F (meth)acrylate, tricyclo[5.2.1.0$^{2,6}$]decanedimethanol di(meth)acrylate, tris (hydroxyethyl)isocyanurate di(meth)acrylate, trimethylolpropane tri(meth)acrylate, ethoxylated trimethylolpropane tri(meth)acrylate, propoxylated trimethylolpropane tri (meth)acrylate, pentaerythritol tri(meth)acrylate, tris((meth) acryloyloxyethyl) phosphate, tris(hydroxyethyl)isocyanurate tri(meth)acrylate, modified ε-caprolactone tri(meth) acrylate, trimethylolpropane ethoxy tri(meth)acrylate, adducts of tris(meth)acrylate with glycerin propylene glycol, pentaerythritol tetra(meth)acrylate, ethoxylated pentaerythritol tetra(meth)acrylate, ditrimethylolpropane tetra(meth) acrylate, dipentaerythritol hexa(meth)acrylate, dipentaerythritol monohydroxy penta(meth)acrylate, acrylic(meth) acrylate, urethane(meth)acrylate, epoxy(meth)acrylate, polyester(meth)acrylate, and unsaturated polyester.

In the curable composition of the present invention, the formulation amount of the silicon-containing highly branched polymer (a) and the active energy ray curable polyfunctional monomer (b) is as shown below. In other words, the silicon-containing highly branched polymer (a) is used in an amount of 0.01 to 10 parts by mass, preferably 0.1 to 10 parts by mass, and particularly preferably 0.1 to 5 parts by mass relative to 100 parts by mass of the polyfunctional monomer (b).

[Polymerization Initiator (c) Generating Radicals by Active Energy Rays]

Examples of the polymerization initiator (c) generating radicals by active energy rays include alkylphenones, benzophenones, ketals, anthraquinones, thioxanthones, azo compounds, peroxides, 2,3-dialkyldione compounds, disulfide compounds, thiuram compounds, and fluoroamine compounds. Among them, the alkylphenones, specifically, α-hydroxyalkylphenones are preferably used. More specific examples include 1-hydroxycyclohexyl phenyl ketone, 2-hydroxy-1-{4-[4-(2-hydroxy-2-methylpropionyl)benzyl] phenyl}-2-methylpropan-1-one, 2-methyl-1-[4-(methylthio) phenyl]-2-morpholinopropan-1-one, benzyl dimethyl ketone, 1-(4-dodecylphenyl)-2-hydroxy-2-methylpropan-1-one, 2-hydroxy-2-methyl-1-phenylpropan-1-one, 1-(4-isopropylphenyl)-2-hydroxy-2-methylpropan-1-one, 2,2-dimethoxy-1,2-diphenylethan-1-one, 1-[4-(2-hydroxyethoxy) phenyl]-2-hydroxy-2-methyl-1-propan-1-one, 2-benzyl-2-dimethylamino-1-(4-morpholinophenyl)-1-butanone, 2-dimethylamino-2-[(4-methylphenyl)methyl]-1-[4-(4-morpholinyl)phenyl]-1-butanone, 2,4,6-trimethylbenzoyldiphenylphosphine oxide, bis(2,4,6-trimethylbenzoyl)(phenyl) phosphine oxide, 2-benzoyloxyimino-1-[4-(phenylthio) phenyl]octan-1-one, 1-{1-[9-ethyl-6-(2-methylbenzoyl)-9H-carbazol-3-yl]ethylideneaminooxy}ethanone, and benzophenone. Among them, 1-hydroxycyclohexyl phenyl ketone, 2-hydroxy-1-{4-[4-(2-hydroxy-2-methylpropionyl)benzyl]phenyl}-2-methylpropan-1-one, and 2-methyl-1-[4-[4-(methylthio)phenyl]-2-morpholinopropan-1-one are preferred because the polymerization by the irradiation of ionizing radiation is initiated and accelerated by these compounds even in a small amount. These compounds may be used singly or in combination of both of them. These compounds are commercially available.

In the curable composition of the present invention, the polymerization initiator (c) is used in an amount of 0.1 to 25 parts by mass, preferably 0.1 to 20 parts by mass, and particularly preferably 1 to 20 parts by mass relative to 100 parts by mass of the polyfunctional monomer (b).

[At Least One Surface Modifier (d) Selected from Group Consisting of Perfluoropolyether Compounds and Silicone Compounds]

The curable composition of the present invention further comprises at least one surface modifier selected from the group consisting of perfluoropolyether compounds and silicone compounds as the component (d).

The at least one surface modifier (d) selected from the group consisting of perfluoropolyether compounds and silicone compounds is preferably a perfluoropolyether compound or silicone compound modified with an organic group at a terminal or both terminals, and is more preferably a perfluoropolyether compound or silicone compound having a (meth)acryloyl group in view of the dispersivity in the active energy ray curable polyfunctional monomer (b). The perfluoropolyether compound having a (meth)acryloyl group is particularly preferred.

Specific examples of the perfluoropolyether compound as the surface modifier (d) used in the present invention include compounds containing a repeating structure of —(O—$CF_2CF_2$)—, —(O—$CF_2CF_2CF_2$)—, or —(O—$CF_2C(CF_3)F$)—. The compound containing such a repeating structure is exemplified by the following compounds.

Compounds modified with alcohol at both terminals: such as FOMBLIN (registered trademark) ZDOL 2000, FOMBLIN ZDOL 2500, FOMBLIN ZDOL 4000, FOMBLIN TX, FOMBLIN ZTETRAOL 2000GT, FLUOROLINK (registered trademark) D10H, and FLUOROLINK E10H [manufactured by Solvay Solexis]

Compounds modified with piperonyl at both terminals: such as FOMBLIN (registered trademark) AM2001 and FOMBLIN AM3001 [manufactured by Solvay Solexis]

Compounds modified with carboxylic acid at both terminals: such as FLUOROLINK (registered trademark) C10 [manufactured by Solvay Solexis]

Compounds modified with ester at both terminals: such as FLUOROLINK (registered trademark) L10H [manufactured by Solvay Solexis]

Compounds modified with (meth)acryl at both terminals: such as FLUOROLINK (registered trademark) MD500, FLUOROLINK MD700, FLUOROLINK 5105X, FLUOROLINK AD1700 [manufactured by Solvay Solexis], and CN4000 [manufactured by Sartomer]

Compounds modified with (meth)acryl at a terminal: such as KY-1203 [manufactured by Shin-Etsu Chemical Co., Ltd.] and OPTOOL (trademark) DAC-HP [manufactured by Daikin Industries, ltd.]

Among them, the compounds modified with (meth)acryl at both terminals or the compounds modified with (meth)acryl at a terminal are preferred, and FLUOROLINK (registered trademark) MD500, FLUOROLINK (registered trademark) MD700, FLUOROLINK (registered trademark) 5105X, FLUOROLINK (registered trademark) AD1700, and KY-1203 are specifically preferred.

Specific examples of the silicone compound as the surface modifier (d) include compounds containing a repeating structure including —(O—$Si(CH_3)_2$)— and —(O—$Si(CH_3)Rf$)— (where Rf is a fluoroalkyl group optionally containing an ether bond and having $CF_3$ at the terminal) such as —(O—$Si(CH_3)(CH_2CH_2CF_3)$)—. The compound containing such a repeating structure is exemplified by the following compounds.

Compounds modified with alcohol at both terminals: such as Silaplane (registered trademark) FM-4411, Silaplane FM-4421, Silaplane FM-4425 [manufactured by JNC], Shin-Etsu Silicone (registered trademark) X-22-160AS, Shin-Etsu Silicone KF-6001, Shin-Etsu Silicone KF-6002, and Shin-Etsu Silicone KF-6003 [manufactured by Shin-Etsu Chemical Co., Ltd.]

Compounds modified with alcohol at a terminal: such as Silaplane (registered trademark) FM-0411, Silaplane FM-0421, Silaplane FM-0425, Silaplane FM-DA11, Silaplane FM-DA21, Silaplane FA-DA26 [manufactured by JNC], Shin-Etsu Silicone (registered trademark) X-22-170BX, Shin-Etsu Silicone X-22-170DX, Shin-Etsu Silicone X-22-176DX, and Shin-Etsu Silicone X-22-176F [manufactured by Shin-Etsu Chemical Co., Ltd.]

Compounds modified with ether at both terminals: such as Shin-Etsu Silicone (registered trademark) X-22-4952, Shin-Etsu Silicone X-22-4272, and Shin-Etsu Silicone X-22-6266 [manufactured by Shin-Etsu Chemical Co., Ltd.]

Compounds modified with polyether at both terminals: such as BYK (registered trademark)-300, BYK-301, BYK-302, BYK-306, BYK-307, BYK-310, BYK-320, BYK-325, BYK-330, BYK-331, BYK-333, BYK-337, BYK-341, BYK-344, BYK-378, and BYK-UV3510 [manufactured by BYK Japan KK]

Hydroxy group-containing compounds modified with polyether at both terminals: such as BYK (registered trademark)-370 and BYK-377 [manufactured by BYK Japan KK]

Hydroxy group-containing compounds modified with polyether: such as BYK (registered trademark)-SILCLEAN (registered trademark) 3720 [manufactured by BYK Japan KK]

Hydroxy group-containing compounds modified with polyether ester at both terminals: such as BYK (registered trademark)-375 [manufactured by BYK Japan KK]

Compounds modified with polyester at both terminals: such as BYK (registered trademark)-310, BYK-315, and BYK-313 [manufactured by BYK Japan KK]

Hydroxy group-containing compounds modified with polyester at both terminals: such as BYK (registered trademark)-370 [manufactured by BYK Japan KK]

Compounds modified with (meth)acryl at both terminals: such as BYK (registered trademark)-UV3500, BYK-UV3570 [manufactured by BYK Japan KK], Silaplane (registered trademark) FM-7711, Silaplane FM-7721, Silaplane FM-7725 [manufactured by JNC], Shin-Etsu Silicone (registered trademark) X-22-164, Shin-Etsu Silicone X-22-164AS, Shin-Etsu Silicone X-22-164A, Shin-Etsu Silicone X-22-164-B, Shin-Etsu Silicone X-22-164C, Shin-Etsu Silicone X-22-164D, Shin-Etsu Silicone X-22-164E [manufactured by Shin-Etsu Chemical Co., Ltd.], SHIKOH (registered trademark) UT-4314, and SHIKOH UV-AF300 [manufactured by The Nippon Synthetic Chemical Industry Co., Ltd.]

Compounds modified with (meth)acryl at a terminal: such as Silaplane (registered trademark) FM-0711, Silaplane FM-0721, Silaplane FM-0725, Silaplane TM-0701, Silaplane TM-0701T [manufactured by JNC], Shin-Etsu Silicone (registered trademark) X-22-174DX, Shin-Etsu Silicone X-22-2426, and Shin-Etsu Silicone X-22-2475 [manufactured by Shin-Etsu Chemical Co., Ltd.]

Compounds modified with carboxyl at both terminals: such as Shin-Etsu Silicone (registered trademark) X-22-162C [manufactured by Shin-Etsu Chemical Co., Ltd.]

Compounds modified with carboxyl at a terminal: such as Shin-Etsu Silicone (registered trademark) X-22-3710 [manufactured by Shin-Etsu Chemical Co., Ltd.]

Hydroxy group-containing (meth)acrylic compounds modified with silicone: such as BYK (registered trademark)-SILCLEAN (registered trademark) 3700 [manufactured by BYK Japan KK]

Among them, the compounds modified with (meth)acryl at both terminals and the compounds modified with (meth)acryl at a terminal are preferred, and SHIKOH (registered trademark) UT-4314 and SHIKOH (registered trademark) UV-AF300 are specifically preferred.

In the surface composition of the present invention, the surface modifier (d) is used in an amount of 0.01 to 10 parts by mass, preferably 0.1 to 10 parts by mass, and particularly preferably 0.1 to 5 parts by mass relative to 100 parts by mass of the polyfunctional monomer (b).

[Solvent (e)]

The curable composition of the present invention may be in a varnish form containing a solvent as a component (e).

The solvent used in the varnish may be any solvent capable of dissolving the component (a) to the component (d). Examples of the solvent include aromatic hydrocarbons such as toluene and xylene; esters or ester ethers such as ethyl acetate, butyl acetate, isobutyl acetate, γ-butyrolactone, methyl pyruvate, ethyl pyruvate, ethyl hydroxyacetate, ethyl lactate, butyl lactate, ethyl 2-hydroxy-2-methylpropionate, methyl 2-hydroxy-3-methylbutanoate, ethyl ethoxyacetate, methyl 3-methoxypropionate, ethyl 3-methoxypropionate, methyl 3-ethoxypropionate, ethyl 3-ethoxypropionate, methyl cellosolve acetate, ethyl cellosolve acetate, propylene glycol monomethyl ether acetate (PGMEA), and propylene glycol monopropyl ether acetate; ethers such as ethylene glycol monomethyl ether, ethylene glycol monoethyl ether, diethylene glycol monomethyl ether, diethylene glycol monoethyl ether, and propylene glycol monomethyl ether (PGME); ketones such as methyl ethyl ketone (MEK), methyl isobutyl ketone (MIBK), cyclopentanone, and cyclohexanone; alcohols such as propylene glycol; and amides such as N,N-dimethylformamide (DMF), N,N-dimethylacetamide, and N-methyl-2-pyrrolidone (NMP). These solvents may be used singly or in combination of two or more of them.

In a case where the curable composition containing no solvent is desired to be used depending on circumstances, an active energy ray curable monomer other than the polyfunctional monomer (b) may be added as a diluent. Such a diluent monomer may be any monomer compatible with the component (a) to the component (d). Examples of the diluent monomer include (meth)acrylates such as methyl(meth)acrylate, tetrahydrofurfuryl(meth)acrylate, cyclohexyl(meth)acrylate, cyclohexyloxymethyl(meth)acrylate, tricyclo[5.2.1.0$^{2,6}$]decanyl(meth)acrylate (also called dicyclopentanyl(meth)acrylate), tricyclo[5.2.1.0$^{2,6}$]dec-3-enyl(meth)acrylate (also called dicyclopentenyl(meth)acrylate), 2-(tricyclo[5.2.1.0$^{2,6}$]dec-3-enyloxy)ethyl(meth)acrylate (also called dicyclopentenyloxyethyl(meth)acrylate), (2-ethyl-2-methyl-1,3-dioxolan-4-yl)methyl(meth)acrylate, (2-isobutyl-2-methyl-1,3-dioxolan-4-yl)methyl(meth)acrylate, 1,4-dioxaspiro[4.5]decan-2-ylmethyl(meth)acrylate, and benzyl(meth)acrylate.

The solid content in the curable composition of the present invention is, for example, 0.5 to 80% by mass, 1.0 to 70% by mass, or 1.0 to 60% by mass. Here, the solid content means all components of the curable composition except the solvent component.

[Other Additives]

The curable composition of the present invention may appropriately contain common additives such as photosensitizers, polymerization inhibitors, polymerization initiators, leveling agents, surfactants, adhesion imparting agents, plasticizers, ultraviolet absorbers, antioxidants, storage stabilizers, antistatic agents, inorganic fillers, pigments, and dyes, as necessary, as long as the effect of the present invention is not impaired.

<Cured Film>

The curable composition of the present invention can be applied onto a substrate and subjected to photopolymerization (curing), forming a molded article such as a cured film and a laminate.

Examples of the substrate include substrates of plastics (including polycarbonate, polymethacrylate, polystyrene, polyesters such as poly(ethylene terephthalate) (PET), polyolefin, epoxy, melamine, triacetylcellulose, acrylonitrile-butadiene-styrene copolymers (ABS), acrylonitrile-styrene copolymers (AS), and norbornene resins), metal substrates, wood substrates, paper substrates, glass substrates, and slate substrates. The substrate may have a plate-like shape or a film-like shape, or be a three-dimensional molded article.

The coating method of the curable composition of the present invention can be appropriately selected from cast coating, spin coating, blade coating, dip coating, roll coating, bar coating, die coating, spray coating, ink-jetting, printing (such as relief printing, intaglio printing, planographic printing, and screen printing), and other coating methods. Among them, the bar coating is preferably employed because it can complete the coating in a short period of time and thus a highly volatile solution can be used. In addition, it advantageously enables uniform coating easily. The above described varnish form can be suitably used as the curable composition used here. It is preferable that the curable composition in the varnish form be previously filtered through a filter having a pore size of about 0.2 µm and then be subjected to coating.

After the coating, the composition is subsequently, preferably pre-dried with an apparatus such as a hot plate and an oven, and then is photo-cured by irradiation with active rays such as ultraviolet rays. Examples of the active rays include ultraviolet rays, electron beams, and X-rays. Examples of the light source used for the ultraviolet irradiation include sunlight, chemical lamps, low-pressure mercury lamps, high-pressure mercury lamps, metal halide lamps, and xenon lamps.

Subsequently, post-baking, specifically heating with an apparatus such as a hot plate and an oven, is carried out, completing the polymerization.

The film formed by coating typically has a thickness of 0.01 to 50 µm, preferably 0.05 to 30 µm, and particularly preferably 0.1 to 30 µm after drying and curing.

<Hard Coat Film>

The present invention still relates to a hard coat film comprising a hard coat layer on at least one side of a film substrate. The hard coat film is formed by a step of applying the curable composition on the film substrate to form a coating film, a step of drying the coating film to remove the solvent, and a step of irradiating the coating film with ultraviolet rays to cure the coating film.

The substrate, the method for coating the film, and the ultraviolet irradiation used here are the same as the substrate, the coating method, and the ultraviolet irradiation in the section <Cured Film> described above.

In the hard coat film, the hard coat layer preferably has a film thickness of 0.1 to 30 μm.

The hard coat film obtained from the curable composition of the present invention has high slippage and water/oil repellency and also has antifouling properties such as fingerprint resistance and dirt wiping-off properties.

Therefore, the hard coat film of the present invention is useful as the material of a hard coat layer on the surface of various displays such as LCDs, PDPs, and touch panels.

In the present invention, the fingerprint resistance means that fingerprints attached are unnoticeable and easily removed, and includes characteristics of inherently preventing fingerprints from adhering.

The dirt wiping-off properties mean that an oil based ink attached on a surface is easily wiped off.

EXAMPLES

The present invention will next be described in further detail with reference to examples, but is not limited to the examples.

In the examples, the following apparatuses and conditions were used for the preparation of samples and the determination of physical properties.

(1) $^{13}$C NMR Spectrum
    Apparatus: JNM-ECA700 manufactured by JEOL Ltd.
    Solvent: CDCl$_3$
    Internal standard: CDCl$_3$ (77.0 ppm)

(2) Gel Permeation Chromatography (GPC)
    Apparatus: HLC-8220GPC manufactured by Tosoh Corporation
    Column: Shodex (registered trademark) GPC KF-804 L, GPC KF-805 L manufactured by Showa Denko K. K.
    Column temperature: 40° C.
    Solvent: Tetrahydrofuran
    Detector: RI (3) Measurement of Glass Transition Temperature (Tg)
    Apparatus: DSC204F1 Phoenix manufactured by NETZSCH
    Measurement condition: In a nitrogen atmosphere
    Temperature increase rate: 5° C./min (25 to 160° C.)

(4) Measurement of 5% Weight Loss Temperature (Td$_{5\%}$)
    Apparatus: Thermogravimetric/differential thermal analyser, TG-DTA2000SA manufactured by Bruker AXS
    Measurement condition: In an air atmosphere
    Temperature increase rate: 10° C./min (25 to 400° C.)

(5) Wire Bar Coater
    Apparatus: PM-9050MC manufactured by SMT Co., Ltd.
    Wire bar: No. 9
    Coating speed: 4 m/min (6) Oven
    Apparatus: Automatic oven, LDO-450S manufactured by As One Corporation (7) UV Irradiation Apparatus
    Apparatus: Ultraviolet irradiation conveyor system under nitrogen purge with a 4-kW lamp, manufactured by Eye Graphics Co., Ltd.

(8) Measurement of Contact Angle
    Apparatus: DropMaster DM-701 manufactured by Kyowa Interface Science Co., Ltd.
    Measurement temperature: 25° C.
    Measurement method: A contact angle was determined at 10 seconds after a measurement solvent attached on a film surface; the measurement was carried out five times for a single film; and the mean value was calculated as a contact angle value.

(9) Measurement of Coefficient of Kinetic Friction
    Apparatus: Variable load friction and abrasion tester, TRIBOGEAR HHS2000 manufactured by Shinto Scientific Co., Ltd.
    Load condition: 50 g
    Probe: 0.6 mmR sapphire pin
    Measurement speed: 1 mm/sec DCP: Tricyclo[5.2.1.0$^{2,6}$]decanedimethanol dimethacrylate [DCP manufactured by Shin Nakamura Chemical Co., Ltd.]

PGHM: 2-Hydroxy-1,3-dimethacryloxypropane [701 manufactured by Shin Nakamura Chemical Co., Ltd.]

PSPA: Reactive silicone [Silaplane FM-0721 manufactured by INC, a weight average molecular weight Mw of 5,000]

STA: Stearyl acrylate [STA manufactured by Osaka Organic Chemical Industry Ltd.]

ADVN: 2,2'-Azobis(2,4-dimethylvaleronitrile) [V-65 manufactured by Wako Pure Chemical Industries, Ltd.]

MAIB: 2,2'-Azobis(methyl isobutyrate) [MAIB manufactured by Otsuka Chemical Co., Ltd.]

EB350: Silicone diacrylate [EBECRYL350 manufactured by Daicel-Cytec]

PFPE: Reactive perfluoropolyether [KY-1203 manufactured by Shin-Etsu Chemical Co., Ltd.]

FS: Reactive fluorosilicone [SHIKOH (registered trademark) UV-AF300 manufactured by The Nippon Synthetic Chemical Industry Co., Ltd.]

PS: Reactive silicone [SHIKOH (registered trademark) UT-4314 manufactured by The Nippon Synthetic Chemical Industry Co., Ltd.]

M403: Five- to six-functional aliphatic acrylate [Aronix (registered trademark) M-403 manufactured by TOAGOSEI CO., LTD.]

EB5129: Six-functional aliphatic urethane acrylate [EBECRYL5129 manufactured by Daicel-Cytec]

Irg184: 1-Hydroxycyclohexyl phenyl ketone [IRGACURE (registered trademark) 184 manufactured by BASF Japan Ltd.]

MIBK: Methyl isobutyl ketone

[Example 1] Production of Highly Branched Polymer HBP1 Having Polysiloxane Chain by Using PGHM, PSPA, and MAIB Into a 100-mL reaction flask, 34 g of MIBK was placed, and a nitrogen stream was introduced for 5 minutes while the solvent was stirred. The flask was heated until the solvent was refluxed (at about 116° C.).

Separately, into a 50-mL reaction flask, 2.3 g (10 mmol) of PGHM as the monomer A, 0.3 g (0.05 mmol) of PSPA as the monomer B, 1.4 g (6 mmol) of MAIB as the polymerization initiator D, and 34 g of MIBK were placed. A nitrogen stream was introduced for 5 minutes while the mixture was stirred, purging the system with nitrogen.

To the MIBK being refluxed in the 100-mL reaction flask, the contents in the 50-mL reaction flask, in which PGHM, PSPA, and MAIB had been placed, were added dropwise with a dropping pump over 30 minutes. After the completion of the dropwise addition, the mixture was stirred for another 1 hour.

Next, 59 g of MIBK was distilled off from the reaction solution with a rotary evaporator. The residue was added to 150 g of hexane, and the polymer was precipitated in a slurry form. The slurry was filtered under reduced pressure, and the collected polymer was dried under vacuum, yielding 2.1 g of a target compound (HBP1) as a white powder.

FIG. 1 shows a $^{13}$C NMR spectrum of the obtained target compound. The unit structure formulation (molar ratio) of HBP1 of the structural formulae shown below was calculated from the $^{13}$C NMR spectrum, revealing a ratio PGHM unit [A-1]: PSPA unit [B]:MAIB unit [D-1] of 50:1:49. The target compound had a weight average molecular weight Mw of 2,100 determined by GPC in terms of polystyrene, a degree of distribution, Mw (weight average molecular weight)/Mn (number average molecular weight), of 1.7, a glass transition temperature Tg of 42.1° C., and a 5% weight loss temperature Td$_{5\%}$ of 251.5° C.

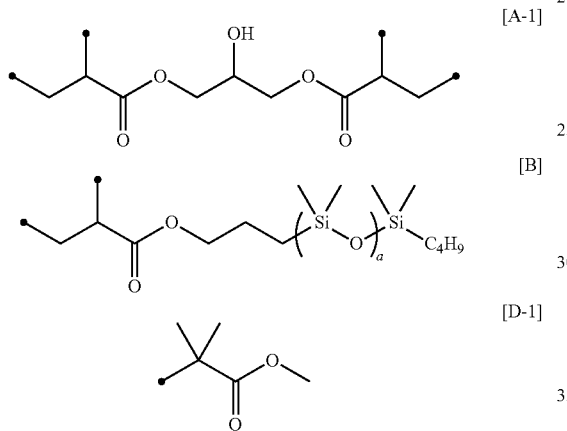

In the formulae, the black points are bonding terminals.

[Example 2] Production of Highly Branched Polymer HBP2 Having Polysiloxane Chain by Using DCP, PSPA, STA, and ADVN Into a 300-mL reaction flask, 100 g of MIBK was placed, and a nitrogen stream was introduced for 5 minutes while the solvent was stirred. The flask was heated until the solvent was refluxed (at about 116° C.).

Separately, into a 200-mL reaction flask, 6.7 g (20 mmol) of DCP as the monomer A, 1.0 g (0.2 mmol) of PSPA as the monomer B, 3.2 g (10 mmol) of STA as the monomer C, 1.4 g (6 mmol) of ADVN as the polymerization initiator D, and 100 g of MIBK were placed. A nitrogen stream was introduced for 5 minutes while the mixture was stirred, purging the system with nitrogen.

To the MIBK being refluxed in the 300-mL reaction flask, the contents in the 200-mL reaction flask, in which DCP, PSPA, STA, and ADVN had been placed, were added dropwise with a dropping pump over 30 minutes. After the completion of the dropwise addition, the mixture was stirred for another 1 hour.

Next, 186 g of MIBK was distilled off from the reaction solution with a rotary evaporator. The residue was added to 332 g of methanol, and the polymer was precipitated in a slurry form. The slurry was filtered under reduced pressure, and the collected polymer was dried under vacuum, yielding 4.1 g of a target compound (HBP2) as a white powder.

Figure 2:
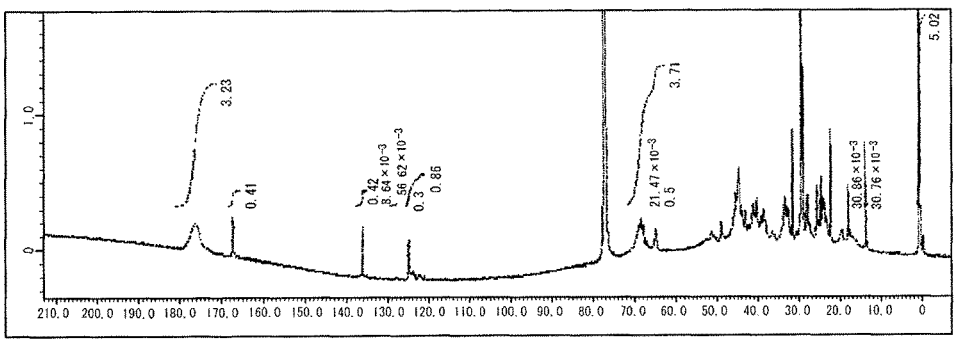
FIG. 2 is a view showing a $^{13}C$ NMR spectrum of HBP2 obtained in Example 2.

FIG. 2 shows a $^{13}$C NMR spectrum of the obtained target compound. The unit structure formulation (molar ratio) of HBP2 of the structural formulae shown below was calculated from the $^{13}$C NMR spectrum, revealing a ratio DCP unit [A-2]:PSPA unit [B]:STA unit [C]:ADVN unit [D-2] of 69:1:21:9. The target compound had a weight average molecular weight Mw of 8,300 determined by GPC in terms of polystyrene, a degree of distribution Mw/Mn of 2.4, a glass transition temperature Tg of 70.7° C., and a 5% weight loss temperature Td$_{5\%}$ of 292.5° C.

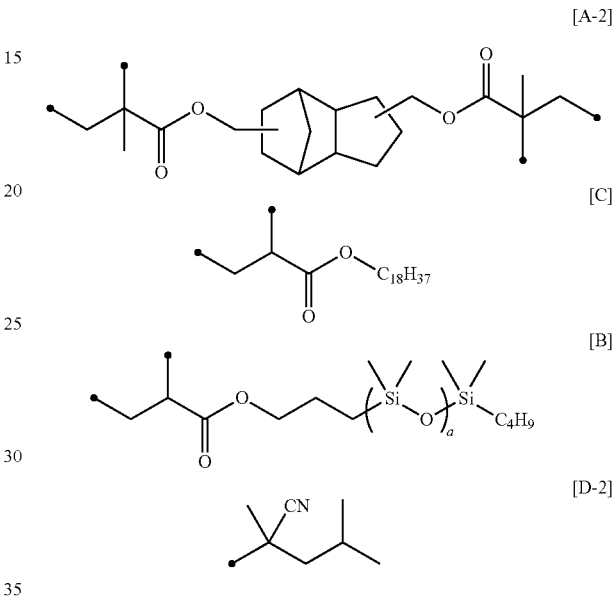

In the formulae, the black points are bonding terminals.

Synthesis Example 1

Production of Highly Branched Polymer HBP3 by Using DCP, STA, and ADVN

Into a 200-mL reaction flask, 53 g of toluene was placed, and a nitrogen stream was introduced for 5 minutes while the solvent was stirred. The flask was heated until the solvent was refluxed (at about 110° C.).

Separately, into a 100-mL reaction flask, 6.7 g (20 mmol) of DCP as the monomer A, 3.2 g (10 mmol) of STA as the monomer C, 3.0 g (12 mmol) of ADVN as the polymerization initiator D, and 53 g of toluene were placed. A nitrogen stream was introduced for 5 minutes while the mixture was stirred, purging the system with nitrogen. The mixture was cooled to 0° C. on an ice bath.

To the toluene being refluxed in the 200-mL reaction flask, the contents in the 100-mL reaction flask, in which DCP, STA, and ADVN had been placed, were added dropwise with a dropping pump over 30 minutes. After the completion of the dropwise addition, the mixture was stirred for another 1 hour.

Next, 80 g of toluene was distilled off from the reaction solution with a rotary evaporator. The residue was added to 330 g of a mixed solution of hexane and ethanol (a mass ratio of 1:2), and the polymer was precipitated in a slurry form. The slurry was filtered under reduced pressure, and the collected polymer was dried under vacuum, yielding 5.3 g of a target compound (HBP3) as a white powder.

Figure 3:
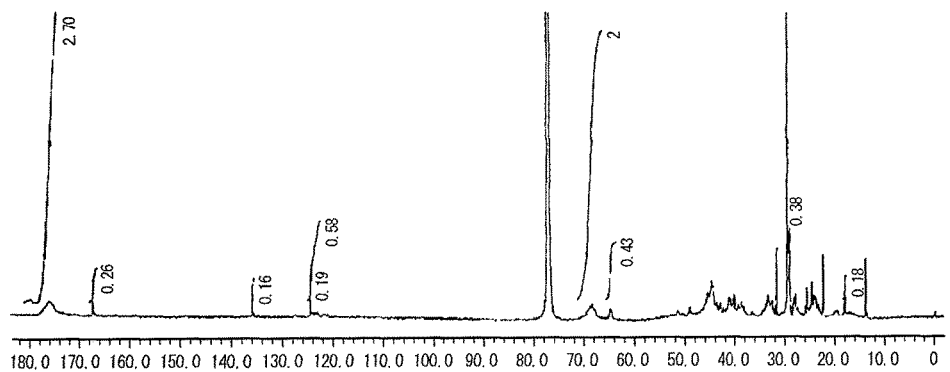
FIG. 3 is a view showing a $^{13}C$ NMR spectrum of HBP3 obtained in Synthesis Example 1.

FIG. 3 shows a $^{13}$C NMR spectrum of the obtained target compound. The unit structure formulation (molar ratio) of HBP3 of the structural formulae shown below was calculated from the $^{13}$C NMR spectrum, revealing a ratio DCP unit [A-2]:STA unit [C]:ADVN unit [D-2] of 58:24:18. The target compound had a weight average molecular weight Mw of 10,000 determined by GPC in terms of polystyrene, a degree of distribution Mw/Mn of 2.1, a glass transition temperature Tg of 67.2° C., and a 5% weight loss temperature $Td_{5\%}$ of 296.1° C.

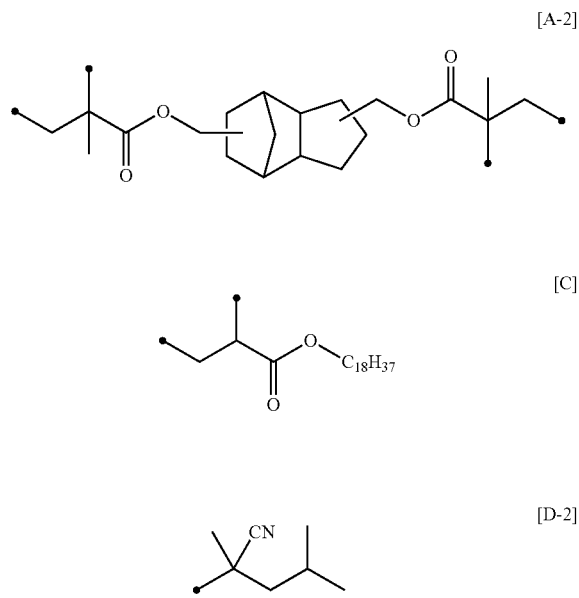

In the formulae, the black points are bonding terminals.

[Example 3] Fabrication of Hard Coat Film from Curable Composition Containing Silicon-Containing Highly Branched Polymer First, 1.0 g of M403 and 0.7 g of EB5129 as the polyfunctional monomers, 0.007 g (0.4 part by mass relative to 100 parts by mass of the polyfunctional monomers) of HBP1 produced in Example 1 as the silicon-containing highly branched polymer, 0.1 g (6 parts by mass relative to 100 parts by mass of the polyfunctional monomers) of Irg184 as the polymerization initiator, and 2.7 g of MIBK were mixed, and the mixture was stirred to be dissolved, giving a uniform curable composition.

The curable composition was applied on an A4-size PET film [Cosmoshine (registered trademark) A4100 manufactured by Toyobo Co., Ltd.] with a wire bar (a groove thickness of 20 μm) by bar coating (a coating speed of 4 m/min), giving a coating film. The obtained coating film was dried in an oven at 100° C. for 3 minutes to remove the solvent, and then was irradiated with UV light at an exposure amount of 300 mJ/cm$^2$ in a nitrogen atmosphere. A hard coat film having a film thickness of about 4 to 6 μm was thus fabricated.

The water contact angle, the oleic acid contact angle, the oil based ink resistance, the coefficient of kinetic friction, and the slippage of the surface of the obtained hard coat film were evaluated. To evaluate the oil based ink resistance, lines were drawn on the surface of the hard coat film with an oil based marker [Magic Ink (registered trademark), No. 700, ultrafine (black), manufactured by Teranishi Chemical Industry Co., Ltd.], and the drawn lines were visually observed. The evaluation was carried out in accordance with the standard shown below. To evaluate the slippage, the surface of the hard coat film was rubbed with a nonwoven wiper [BEMCOT (registered trademark) M-1 manufactured by Asahi Kasei Fibers Corp.], and the slippage was evaluated by feel in accordance with the standard shown below. Table 1 shows the results.

[Evaluation Standard for Oil Based Ink Resistance]

A: The oil based ink is repelled to form dots, and lines are hardly drawn.

B: Lines fade in some places and are not clearly drawn.

C: Lines can be drawn.

[Evaluation Standard for Slippage]

A: Almost no resistance is observed.

B: Some resistance is observed, but the surface can be smoothly rubbed.

C: Resistance is observed, and the surface cannot be smoothly rubbed.

[Examples 4 to 9] Fabrication of Hard Coat Film from Curable Composition Containing Silicon-Containing Highly Branched Polymer Hard coat films were produced and evaluated in the same manner as in Example 3 except that the types and the amounts of the silicon-containing highly branched polymer and the surface modifier were changed as described in Table 1. Table 1 shows the results.

[Comparative Examples 1 to 3] Fabrication of Hard Coat Film from Curable Composition Containing No Silicon-Containing Highly Branched Polymer Hard coat films were produced and evaluated in the same manner as in Example 3 except that no silicon-containing highly branched polymer was added, and the type and the amount of the surface modifier was changed as described in Table 1. Table 1 shows the results.

[Comparative Examples 4 to 6] Fabrication of Hard Coat Film from Curable Composition Containing General-Purpose Slippage Improver Hard coat films were produced and evaluated in the same manner as in Example 3 except that the silicon-containing highly branched polymer HBP1 was replaced by a general-purpose slippage improver EB350, and the type and the amount of the surface modifier was changed as described in Table 1. Table 1 shows the results.

[Comparative Example 7] Fabrication of Hard Coat Film from Curable Composition Containing Highly Branched Polymer without Polysiloxane Chain A hard coat film was produced and evaluated in the same manner as in Example 3 except that the silicon-containing highly branched polymer HBP1 was replaced by HBP3 produced in Synthesis Example 1, and no surface modifier was added. Table 1 shows the results.

TABLE 1

| | Silicon-containing polymer | | Surface modifier | | Contact angle [degree] | | | | |
|---|---|---|---|---|---|---|---|---|---|
| | Type | Amount [parts by mass] | Type | Amount [parts by mass] | Water | Oleic acid | Coefficient of kinetic friction | Oil based ink resistance | Slippage |
| Example 3 | HBP1 | 0.4 | None | — | 93 | 49 | 0.03 | C | A |
| Example 4 | HBP1 | 0.4 | PFPE | 0.2 | 108 | 74 | 0.02 | A | A |
| Example 5 | HBP1 | 0.4 | FS | 1.6 | 103 | 54 | 0.03 | B | A |
| Example 6 | HBP2 | 0.4 | None | — | 105 | 48 | 0.02 | C | A |
| Example 7 | HBP2 | 0.4 | PFPE | 0.2 | 110 | 73 | 0.03 | A | A |
| Example 8 | HBP2 | 0.4 | FS | 1.6 | 103 | 52 | 0.02 | B | A |
| Example 9 | HBP2 | 0.4 | PS | 1.6 | 100 | 51 | 0.02 | B | A |
| Comparative Example 1 | None | — | None | — | 67 | 13 | 0.35 | C | C |
| Comparative Example 2 | None | — | PFPE | 0.2 | 112 | 76 | 0.04 | A | B |
| Comparative Example 3 | None | — | FS | 1.6 | 97 | 54 | 0.08 | B | C |
| Comparative Example 4 | EB350 | 0.4 | None | — | 88 | 52 | 0.06 | B | B |
| Comparative Example 5 | EB350 | 0.4 | PFPE | 0.2 | 109 | 75 | 0.04 | A | B |
| Comparative Example 6 | EB350 | 0.4 | FS | 1.6 | 102 | 53 | 0.04 | B | B |
| Comparative Example 7 | HBP3 | 0.4 | None | — | 89 | 8 | 0.40 | C | C |

As shown in Table 1, the hard coat films (Examples 3 to 9) each produced from the curable composition containing the silicon-containing highly branched polymer of the present invention had markedly higher slippage than those of the films produced without the highly branched polymer (Comparative Examples 1 to 3), the films produced by using the chain silicone compound, which is a general-purpose slippage improver, in place of the highly branched polymer (Comparative Examples 4 to 6), and the film produced by using the highly branched polymer containing no polysiloxane chain in place of the highly branched polymer (Comparative Example 7). In other words, the addition of the silicon-containing highly branched polymer of the present invention to a curable composition (coating liquid) allows a coating film obtained from the composition to have high slippage, and enables the production of a coating film having excellent surface characteristics of antifouling properties such as fingerprint resistance and dirt wiping-off properties and of surface slippage.

The invention claimed is:

1. A silicon-containing highly branched polymer obtained by polymerization of a monomer A having two or more radically polymerizable double bonds in a molecule and a monomer B having a polysiloxane chain and at least one radically polymerizable double bond in a molecule in the presence of a polymerization initiator D in an amount of 5 to 200% by mole relative to the number of moles of the monomer A,
wherein the silicon-containing highly branched polymer is obtained by using the monomer B in an amount of 0.01 to 10% by mole relative to the number of moles of the monomer A.

2. The silicon-containing highly branched polymer of claim 1, wherein a monomer C having a $C_{6-30}$ alkyl group or a $C_{3-30}$ alicyclic group and at least one radically polymerizable double bond in a molecule is further polymerized with the monomer A, the monomer B and the polymerization initiator D to obtain the silicon-containing highly branched polymer.

3. The silicon-containing highly branched polymer according to claim 1, wherein
the monomer B is a compound having at least one of a vinyl group and a (meth)acrylic group.

4. The silicon-containing highly branched polymer according to claim 3, wherein
the monomer B is a compound of Formula [1]:

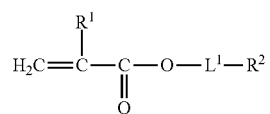

where $R^1$ is a hydrogen atom or a methyl group; $R^2$ is a polysiloxane chain bonded to $L^1$ through a silicon atom; and $L^1$ is a $C_{1-6}$ alkylene group.

5. The silicon-containing highly branched polymer according to claim 4, wherein
the monomer B is a compound of Formula [2]:

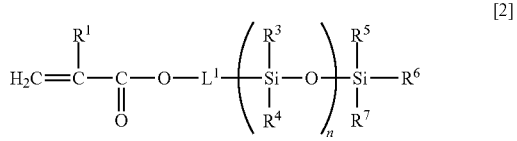

where each of $R^1$ and $L^1$ is the same as defined in Formula [1]; each of $R^3$ to $R^7$ is independently a $C_{1-6}$ alkyl group; and n is an integer of 1 to 200.

6. The silicon-containing highly branched polymer according to claim 1, wherein
the monomer A is a compound having one or both of a vinyl group and a (meth)acrylic group.

7. The silicon-containing highly branched polymer according to claim 6, wherein the monomer A is a divinyl compound or a di(meth)acrylate compound.

8. The silicon-containing highly branched polymer according to claim 2, wherein
the monomer C is a compound having at least one of a vinyl group and a (meth)acrylic group.

9. The silicon-containing highly branched polymer according to claim 8, wherein
the monomer C is a compound of Formula [3]:

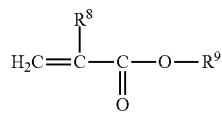

[3]

where $R^8$ is a hydrogen atom or a methyl group; and $R^9$ is a $C_{6-30}$ alkyl group or a $C_{3-30}$ alicyclic group.

10. The silicon-containing highly branched polymer according to claim 1, wherein
the polymerization initiator D is an azo polymerization initiator.

11. The silicon-containing highly branched polymer according to claim 2, wherein
the silicon-containing highly branched polymer is obtained by using the monomer B in an amount of 0.01 to 10% by mole and the monomer C in an amount of 10 to 300% by mole relative to the number of moles of the monomer A.

12. A varnish comprising:
the silicon-containing highly branched polymer as claimed in claim 1.

13. A curable composition comprising:
a silicon-containing highly branched polymer (a) in an amount of 0.01 to 10 parts by mass, the silicon-containing highly branched polymer being obtained by polymerization of a monomer A having two or more radically polymerizable double bonds in a molecule and a monomer B having a polysiloxane chain and at least one radically polymerizable double bond in a molecule in the presence of a polymerization initiator D in an amount of 5 to 200% by mole relative to the number of moles of the monomer A;
an active energy ray curable polyfunctional monomer (b) in an amount of 100 parts by mass; and
a polymerization initiator (c) generating a radical by an active energy ray in an amount of 0.1 to 25 parts by mass.

14. The curable composition according to claim 13, wherein
the polyfunctional monomer (b) is at least one selected from the group consisting of polyfunctional (meth)acrylate compounds and polyfunctional urethane (meth)acrylate compounds.

15. The curable composition according to claim 13, wherein
the polymerization initiator (c) is an alkylphenone compound.

16. The curable composition according to claim 13, further comprising at least one surface modifier (d) selected from the group consisting of perfluoropolyether compounds and silicone compounds, in an amount of 0.01 to 10 parts by mass.

17. The curable composition according to claim 16, wherein
the surface modifier (d) is a compound having a (meth)acryloyl group.

18. The curable composition according to claim 13, further comprising a solvent (e).

19. A cured film obtained from the curable composition as claimed in claim 13.

20. A hard coat film comprising:
a hard coat layer on at least one side of a film substrate, wherein
the hard coat layer is formed by applying the curable composition as claimed in claim 18 on the film substrate to form a coating film, drying the coating film to remove the solvent, and irradiating the coating film with ultraviolet rays to cure the coating film.

21. The hard coat film according to claim 20, wherein
the hard coat layer has a film thickness of 0.1 to 30 μm.

22. The silicon-containing highly branched polymer according to claim 1, wherein
the silicon-containing highly branched polymer is obtained by using the monomer B in an amount of 0.1 to 5% by mole relative to the number of moles of the monomer A.

23. The silicon-containing highly branched polymer according to claim 1, wherein
the silicon-containing highly branched polymer is obtained by using the monomer A, the monomer B and a monomer other than the monomer A and the monomer B.

24. The silicon-containing highly branched polymer according to claim 2, wherein
the silicon-containing highly branched polymer is obtained by using the monomer A, the monomer B, the monomer C and a monomer other than the monomer A, the monomer B and the monomer C.

25. The curable composition according to claim 13, wherein
the silicon-containing highly branched polymer is obtained by using the monomer A, the monomer B and a monomer other than the monomer A and the monomer B.

26. The curable composition according to claim 13, wherein
the silicon-containing highly branched polymer (a) is obtained by polymerizing a monomer C having a $C_{6-30}$ alkyl group or a $C_{3-30}$ alicyclic group and at least one radically polymerizable double bond in a molecule with the monomer A, the monomer B and the polymerization initiator D.

27. The curable composition according to claim 26, wherein
the silicon-containing highly branched polymer (a) is obtained by using the monomer A, the monomer B, the monomer C and a monomer other than the monomer A, the monomer B and the monomer C.

28. The cured film according to claim 19, wherein
the silicon-containing highly branched polymer (a) in the curable composition is obtained by using the monomer A, the monomer B and a monomer other than the monomer A and the monomer B.

29. The cured film according to claim 19, wherein
the silicon-containing highly branched polymer (a) in the curable composition is obtained by polymerizing a monomer C having a $C_{6-30}$ alkyl group or a $C_{3-30}$ alicyclic group and at least one radically polymerizable double bond in a molecule with the monomer A, the monomer B and the polymerization initiator D.

30. The cured film according to claim 29, wherein the silicon-containing highly branched polymer (a) is obtained by using the monomer A, the monomer B, the monomer C and a monomer other than the monomer A, the monomer B and the monomer C.

31. The hard coat film according to claim 20, wherein the silicon-containing highly branched polymer (a) in the curable composition is obtained by using the monomer A, the monomer B and a monomer other than the monomer A and the monomer B.

32. The hard coat film according to claim 20, wherein the silicon-containing highly branched polymer (a) in the curable composition is obtained by polymerizing a monomer C having a $C_{6-30}$ alkyl group or a $C_{3-30}$ alicyclic group and at least one radically polymerizable double bond in a molecule with the monomer A, the monomer B and the polymerization initiator D.

33. The hard coat film according to claim 32, wherein the silicon-containing highly branched polymer (a) is obtained by using the monomer A, the monomer B, the monomer C and a monomer other than the monomer A, the monomer B and the monomer C.

\* \* \* \* \*